United States Patent [19]

Maeda et al.

[11] Patent Number: 5,233,296
[45] Date of Patent: Aug. 3, 1993

[54] FLOPPY DISK DRIVE REVOLUTION DETECTOR AVOIDING INTERFERENCE WITH MAGNETIC CIRCUIT

[75] Inventors: Hideho Maeda, Kanagawa; Masanori Kitamura, Tokyo, both of Japan

[73] Assignee: Sony Corporation, Kitashinagawa, Japan

[21] Appl. No.: 477,535

[22] Filed: Feb. 9, 1990

[30] Foreign Application Priority Data

Feb. 9, 1989 [JP] Japan .................. 1-030580

[51] Int. Cl.⁵ .................. G01B 7/14; G01P 3/36
[52] U.S. Cl. .................. 324/207.22; 324/207.13; 324/175
[58] Field of Search .......... 324/174, 175, 226, 207.14, 324/207.22, 207.13; 388/809, 933; 318/640; 250/231.13, 215; 310/156

[56] References Cited

U.S. PATENT DOCUMENTS

| | | | |
|---|---|---|---|
| 3,231,807 | 1/1966 | Willis | 324/175 |
| 4,455,516 | 6/1984 | Furusho | 310/156 |
| 4,529,903 | 7/1985 | Takahashi et al. | 310/156 |
| 4,611,168 | 9/1986 | Kudelski et al. | 324/174 |

FOREIGN PATENT DOCUMENTS 60-237846  11/1985  Japan ................... 318/640

*Primary Examiner*—Walter E. Snow
*Attorney, Agent, or Firm*—Lewis H. Eslinger; Jay H. Maioli

[57] ABSTRACT

In a revolution detector of a drive motor of a disk drive, the rotor of the drive motor comprises a shell and a rotary magnet which is secured to the shell. A plurality of through holes of the detector, in which the rotary magnet is partially exposed, are provided at predetermined intervals in such positions of the shell as to give no influence to the magnetic circuit from which the output of the drive motor is derived, and the revolution characteristic of the drive motor is obtained by means of detecting the holes by a sensor in the detector, so that it becomes easier to manufacture the detector, and it is possible to detect the revolution of the drive motor with high accuracy without lowering the efficiency of the drive motor.

3 Claims, 2 Drawing Sheets

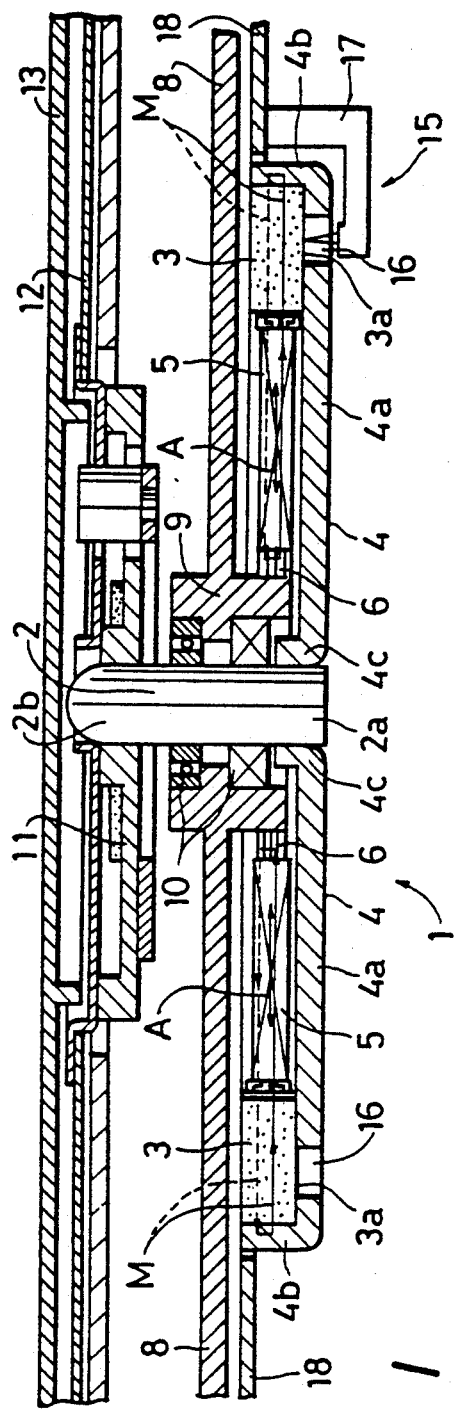
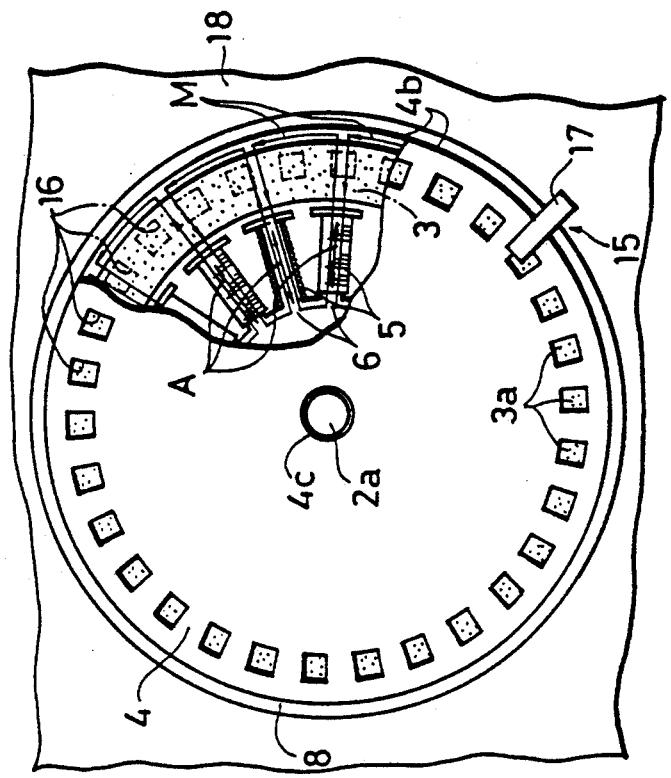
FIG. 1
FIG. 2

FLOPPY DISK DRIVE REVOLUTION DETECTOR AVOIDING INTERFERENCE WITH MAGNETIC CIRCUIT

BACKGROUND OF THE INVENTION

1. Field of the Invention

This invention relates generally to a revolution detector of a drive assembly motor of a disk drive, and is more particularly applicable to the revolution detector of a floppy disk drive.

2. Description of the Prior Art

In the so-called disk drive motor of the floppy disk drive, there is provided a revolution detector, such as a speed detector (FG), and is a phase detector (PG). A revolution detector A of this kind by its such that a magnet of the FG is provided in the rotor of the drive motor, and detected by the detector is an electromotive force which is generated in a printed coil of the FG when the coil periodically approaches the magnet due to rotation of the rotor.

Another revolution detector B of this kind is such that a plurality of notches are provided in a side of the shell of the rotor at predetermined intervals, or a plurality of strips which reflect light are stuck on the periphery of the rotor at predetermined intervals, and the light reflected on the notch or the strip is detected by an optical sensor of the revolution detector (see Japanese Laid Open Patent No. 55-122269).

However, the exemplified revolution detector A, the magnet and the coil of the FG become complicated in structure, so that it makes the production of the detector difficult, and increases the production cost. Further, the flux of the magnet of the FG interferes with the flux of the rotary magnet of the rotor, so that the output of the drive motor is reduced.

Moreover, in the revolution detector B using the strips, it is troublesome to stick the strips on the rotor, so that the production cost increases, and further, it is difficult to stick the strips with high accuracy.

OBJECTS AND SUMMARY OF THE INVENTION

Accordingly, it is an object of the present invention to provide a revolution detector of the drive motor of a disk drive in which a plurality of notches (or holes), which are detected by a sensor, are provided in such positions of the shell of the rotor as to give no influence to the magnetic circuits which are produced in the drive motor, so that it becomes easier to make the output of the drive motor high.

A further object of the invention is to provide a revolution detector for the drive motor of a disk drive in which a plurality of notches (or holes) of the detector are formed in the shell of the rotor of the drive motor simultaneously when the rotor is made by press working sheet metal in order to make the notches simply and accurately, so that it becomes very simple to manufacture the detector, and further, it becomes possible to detect the rotation of the drive motor with high accuracy.

Still a further object of the invention is to provide a revolution detector of the drive motor of a disk drive in which a plurality of notches (or holes) of the detector are disposed in such positions as to face the rotary magnet of the rotor of the drive motor adjacently to the rotary magnet, in order to reduce the thickness and the diameter of the rotor, so that it becomes possible to make the disk drive sufficiently compact and light.

Still another object of the invention is to provide a revolution detector of the drive motor of a disk drive used in order to accomplish the above objects for a drive motor whose stator and rotor face each other in the radial direction of the motor shaft thereof.

Still another object of the invention is to provide a revolution detector of the drive motor of a disk drive used in order to accomplish the above objects for a drive motor whose stator and rotor face each other in the axial direction of the motor shaft thereof.

In accordance with an aspect of this invention, in a revolution detector of the drive motor of a disk drive, by which a disk type recording medium is driven to record or reproduce information through a head, a drive motor having a motor shaft for rotating the recording medium, a rotor comprising a shell and a rotary magnet which is secured to the shell, and a plurality of stator coils secured to a chassis of the disk drive so as to face the rotary magnet; a plurality of through holes which are provided at predetermined intervals along the direction of rotation of the rotor in such positions of the shell as to be parallel to the axes of the stator coils and face the rotary magnet with the rotary magnet being partly exposed through the through holes; and a sensor for detecting the plurality of through holes in turn during rotation of the rotor.

In a preferred embodiment of this invention, the shell of the rotor comprises a circular flat plate portion which extends perpendicularly to the motor shaft, and a cylindrical rim portion which extends in parallel with the motor shaft. The plurality of through holes are disposed in the circular flat plate portion, or in the cylindrical rim portion.

When the through holes are in the circular flat plate portion, the rotary magnet is secured to the shell adjacently to the circular flat plate portion having the rotary magnet exposed through the through holes, and the axis of each stator coil, which faces the inner periphery of the rotary magnet, extending in the radial direction of the motor shaft.

When the through holes are in the cylindrical rim portion, the rotary magnet is secured to the shell adjacent the inside of the cylindrical rim portion having the rotary magnet exposed through the through holes, and the axis of each stator coil, which faces the rotary magnet, extending in the axial direction of the motor shaft.

The above, and other objects, features and advantages of this invention, will be apparent from the following detailed description of illustrative embodiments thereof to be read in connection with the accompanying drawings, wherein like reference numerals identify the same or corresponding parts in the several views.

BRIEF DESCRIPTION OF THE DRAWINGS

FIG. 1 is a cross-sectional view of the drive motor of a disk drive, provided with a revolution detector, according to an embodiment of this invention, with the stator and the rotor of the drive motor facing each other in the radial direction of the motor shaft;

FIG. 2 is a perspective view, partly broken away and viewed from the bottom, of the disk drive motor of FIG. 1;

DETAILED DESCRIPTION OF PREFERRED EMBODIMENTS

Figure 3:
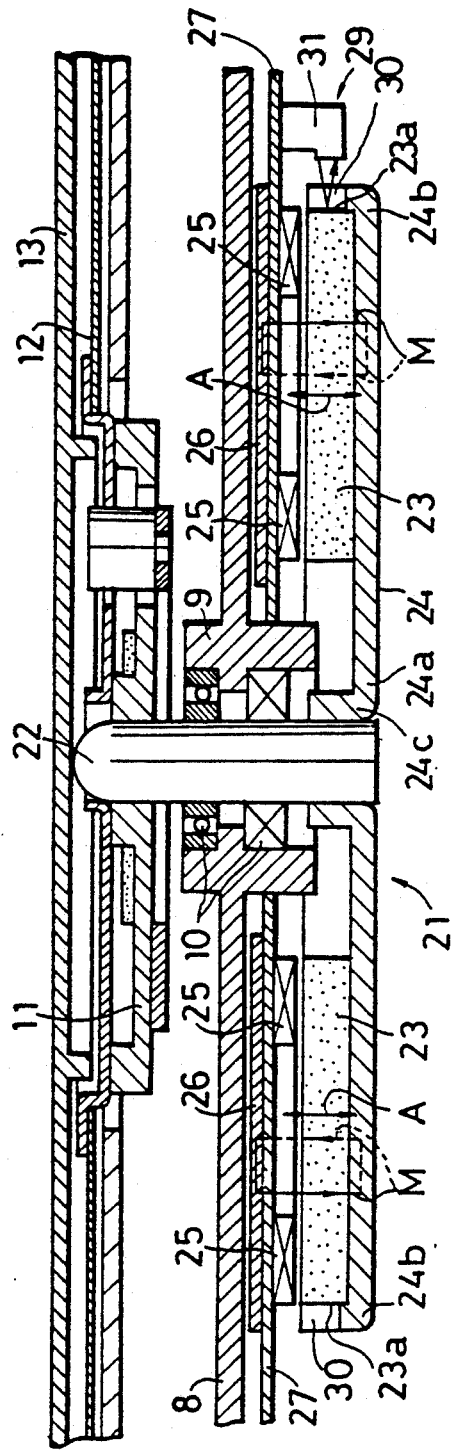
FIG. 3 is a cross-sectional view of another drive motor of a disk drive, provided with a revolution detector, according to an embodiment of this invention, with the stator and the rotor of the drive motor facing each other in the axial direction of the motor shaft.

Referring to the drawings, revolution detectors of the drive assembly motor of a floppy disk drive embodying the present invention will be described.

A revolution detector of the drive motor whose stator and rotor face each other in the radial direction of the motor shaft (FIGS. 1 and 2)

As shown in FIGS. 1 and 2, the rotor of a disk drive motor 1 comprises a motor shaft 2, a tray 4 which is integral with the motor shaft 2, and an annular rotary magnet 3 which is fixed to the tray 4.

The stator of the disk drive motor 1 comprises an iron core 6 and a plurality of coils 5 which are wound around projections of the iron core 6. The tray 4 is formed by press working sheet metal, and the rotary magnet 3 is stuck on the flat plate portion 4a adjacent the cylindrical rim portion 4b of the tray 4 with adhesive or the like. Further, a boss portion 4c is formed at the center of the tray 4.

A cylindrical bearing support 9 is provided in a chassis 8 of the floppy disk drive, and the motor shaft 2 is rotatably supported by at least one bearing 10 which is secured to the bearing support 9. The lower end 2a of the motor shaft 2 is driven, with a press fit, into a hole which is formed by the boss portion 4c of the tray 4, and the iron core 6 is coaxially fixed to the outer periphery of the bearing support 9.

The upper end 2b of the motor shaft 2 is driven with a press fit into the central hole of a turntable 11, or fixed to the turntable 11 in the process of molding. A disk type recording medium 12, such as a floppy disk and the like, is mounted on the turntable, and simultaneously, the upper end 2b of the motor shaft 2 is fitted into the central hole of the recording medium 12. Reference numeral 13 denotes a disk cartridge in which the disk type recording medium 12 is accommodated.

The recording medium 12 is rotated by the turntable 11 which is integral with the rotor of the drive motor 1, and information is recorded on, or reproduced from the recording medium 12 through a record head or a play back head (not shown).

As shown in FIG. 2, the axial direction A of the iron-core coil 5 coincides with the radial direction of the tray 4, and when an electric current is supplied to the coils 5, a magnetic circuit M is produced through the iron core 6, the rotary magnet 3, and the cylindrical rim portion 4b of the tray 4. Thus, a torque of the drive motor 1 is produced. It is to be noted that the magnetic circuit M is not produced in the flat plate portion 4a of the tray 4.

In the meanwhile, a revolution detector 15 of the drive motor 1 comprises a plurality of through holes 16 and a sensor 17 for detecting the through holes 16, and the through holes 16 are provided at predetermined intervals in the flat plate portion 4a of the tray 4 just under the rotary magnet 3 at the time when the tray 4 is formed by press working.

The sensor 17 is secured, for example, to a motor control board (a printed circuit board) 18 for controlling the drive motor 1, the board 18 being fixed to the chassis 8. The outer surface 3a of the rotary magnet 3 is exposed through the through holes 16, and is usually of a black color. On the other hand, the tray 4 is covered by "Zinn" coating, so that it is of a silver color. Further, the sensor 17 is an optical sensor which detects the difference between the reflections on the through holes 16 and on the flat plate portion 4a of the tray 4. Thus, the speed or the phase of the drive motor 1 can be detected by the sensor 17.

If the plurality of through holes 16 are disposed at equal intervals, the revolution detector 15 becomes a speed detector (FG), and if the interval at least between two of the plurality of through holes 16 is changed, the revolution detector 15 becomes a phase detector (PG).

The plurality of through holes 16 are disposed not in the cylindrical rim portion 4b of the tray 4, in which the magnetic circuit M is produced, but in the flat plate portion 4a in which the magnetic circuit M is not produced, so that the through holes 16 do not interfere with the magnetic circuit M, and thus, it is easier to make the output of the drive motor 1 high.

Figure 4:
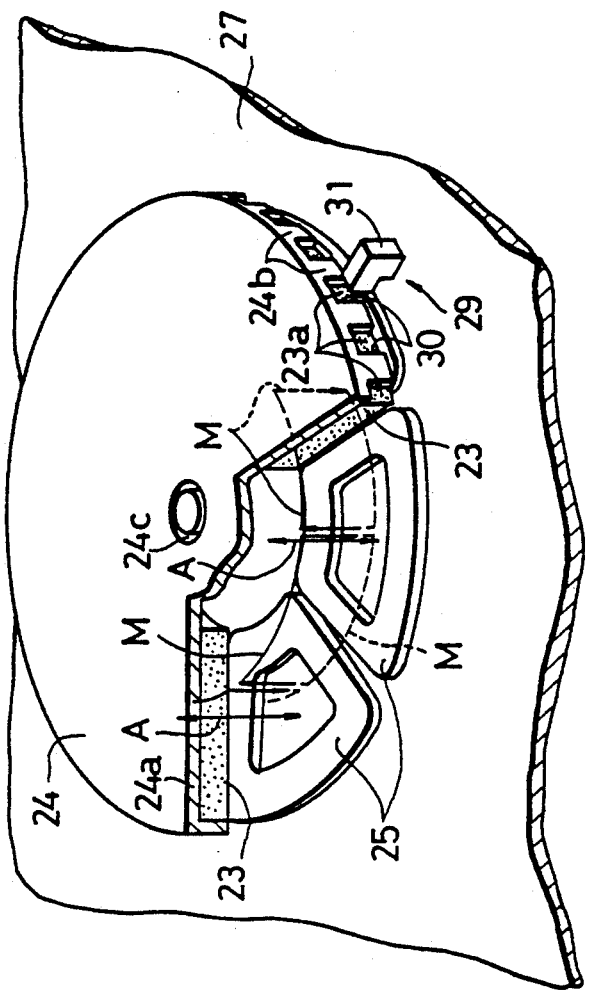
FIG. 4 is a perspective view, partly broken away and viewed from the bottom, of the disk drive motor of FIG. 3.

Another revolution detector of the drive motor whose stator and rotor face each other in the axial direction of the motor shaft (FIGS. 3 and 4)

As shown in FIGS. 3 and 4, the rotor of the disk drive motor 21 comprises a motor shaft 22, a tray 24 which is integral with the motor shaft 22, and an annular rotary magnet 23 which is fixed to the tray 24.

The stator of the disk drive motor 21 comprises a stator yoke 26 and a plurality of stator windings 25, which are in opposed relation to and in parallel with the rotary magnet 23 of the rotor. The tray 24 is formed by press working sheet metal, and the rotary magnet 23 is stuck on the flat plate portion 24a adjacent to the cylindrical rim portion 24b of the tray 24 with adhesive or the like. Further, a boss portion 24c is formed at the center of the tray 24.

The stator yoke 26 and the plurality of stator windings 25 are stuck on a motor control board (a printed circuit board) 27 for controlling the drive motor 21, with adhesive or the like, and the motor control board 27 is fixed to the chassis 8 of the floppy disk drive. Other constructions of the floppy disk drive are the same as those of the floppy disk drive shown in FIG. 1, and the disk drive motor 21 can rotate a disk type recording medium, such as a floppy disk.

As shown in FIG. 4, the axial direction A of the stator windings 25 of the drive motor 21 makes a right angle with the radial direction of the tray 24, and when an electric current is supplied to the stator windings 25, a magnetic circuit M is produced through the center of the stator winding 25, the rotary magnet 23, the flat plate portion 24a of the tray 24, and the stator yoke 26. Thus, a torque of the drive motor 21 is produced. It is to be noted that a magnetic circuit M is not produced in the cylindrical rim portion 24b of the tray 24.

In the meanwhile, a revolution detector 29 of the drive motor 21 comprises a plurality of through holes 30 and a sensor 31 for detecting the through holes 30. The through holes 30 are provided at predetermined intervals in the cylindrical rim portion 24b of the tray 24 just on the outer side of the rotary magnet 23 at the time when the tray 24 is formed by press working.

The sensor 31 is secured, for example, to the motor control board 27, and the outer surface 23a of the rotary magnet 23 is exposed through the through holes 30. Further, sensor 31 is an optical sensor which can detect the reflection like the sensor 17 described above. Thus, the speed or the phase of the drive motor 21 can be detected by a difference between the reflections on the through holes 30 and on the cylindrical rim portion 24b of the tray 24.

The plurality of through holes 30 are disposed not in the flat plate portion 24a of the tray 24, but in the cylindrical rim portion 24b in which the magnetic circuit M is not produced, so that the through holes 30 do not interfere with the magnetic circuit M, and thus, it is easier to make the output of the drive motor 21 high.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims. The present invention is applicable not to the floppy disk drive, but also to various kinds of disk drives for recording information on and/or reproducing information from various kinds of disk type recording medium.

What is claimed is:

1. A revolution detector and drive motor assembly by which a disk-type recording medium is driven to record or reproduce information through a head, the revolution detector and drive motor assembly comprising:
   a drive motor having a motor shaft for rotating a recording medium, a rotor which comprises a shell and a rotary magnet secured to the shell, and a plurality of stator coils secured to a chassis of the disk drive so as to face the rotary magnet, a continuous magnetic circuit being produced through the rotary magnet, the stator coils and a portion of the shell;
   a plurality of holes extending through the rotor at predetermined intervals along a direction of rotation of the rotor in such positions of the shell as to be parallel to axes of the stator coils, as to face the rotary magnet, and as to be spaced apart from the magnetic circuit so that the magnetic flux in the magnetic circuit is substantially unaffected by rotation of the recording medium, the rotary magnet being partially exposed through the holes; and
   an optical sensor for detecting the plurality of holes in turn during rotation of the rotor.

2. A revolution detector and drive motor assembly according to claim 1, wherein the shell of the rotor comprises a circular flat plate portion which extends perpendicularly to the motor shaft and in which the plurality of holes are disposed, and a cylindrical rim portion which extends in parallel with the motor shaft; the rotary magnet is secured to the shell adjacent the circular flat plate portion to expose the rotary magnet through the holes; and an axis of each stator coil, which faces the inner periphery of the rotary magnet, extends in the radial direction of the motor shaft.

3. A revolution detector and drive motor assembly according to claim 1, wherein the shell of the rotor comprises a circular flat portion which extends perpendicularly to the motor shaft, and a cylindrical rim portion which extends in parallel with the motor shaft and in which the plurality of holes are disposed; the rotary magnet is secured to the shell adjacent an inside surface of the cylindrical rim portion to have the rotary magnet exposed through the holes; and an axis of each stator coil, which faces the rotary magnet, extends in the axial direction of the motor shaft.

* * * * *